J. NEIMEYER.

Assignor to THE WHEELER, MADDEN & CLEMSEN MAN'FING. CO.

CROSS-CUT SAW-HANDLE.

No. 7,543. Reissued Feb. 27, 1877

Witnesses:
P. C. Dieterich.
Frank H. Duffy

Inventor:
Jacob Neimeyer
Per: C. H. Watson & Co Attorneys.

N. PETERS, PHOTO-LITHOGRAPHER, WASHINGTON, D. C.

UNITED STATES PATENT OFFICE.

JACOB NEIMEYER, OF HAMILTON, OHIO, ASSIGNOR TO THE WHEELER, MADDEN & CLEMSEN MANUFACTURING COMPANY.

IMPROVEMENT IN CROSSCUT-SAW HANDLES.

Specification forming part of Letters Patent No. 27,303, dated February 28, 1860; extended seven years; reissue No. 7,543, dated February 27, 1877; application filed February 9, 1877.

*To all whom it may concern:*

Be it known that I, JACOB NEIMEYER, of Hamilton, in the county of Butler and State of Ohio, have invented certain new and useful Improvements in Crosscut-Saw Handles; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This application relates to handles for crosscut-saws, having for its object to provide a handle that is reliable and efficient in operation, and which can be attached and detached at the will of the operator; and it consists in providing a handle for saws, having means by which the saw can readily be attached and detached, and also in the construction of said means, by which the saw is held by a clamping-pressure without perforating the saw-blade, and without the use of rivets.

Figure 1:
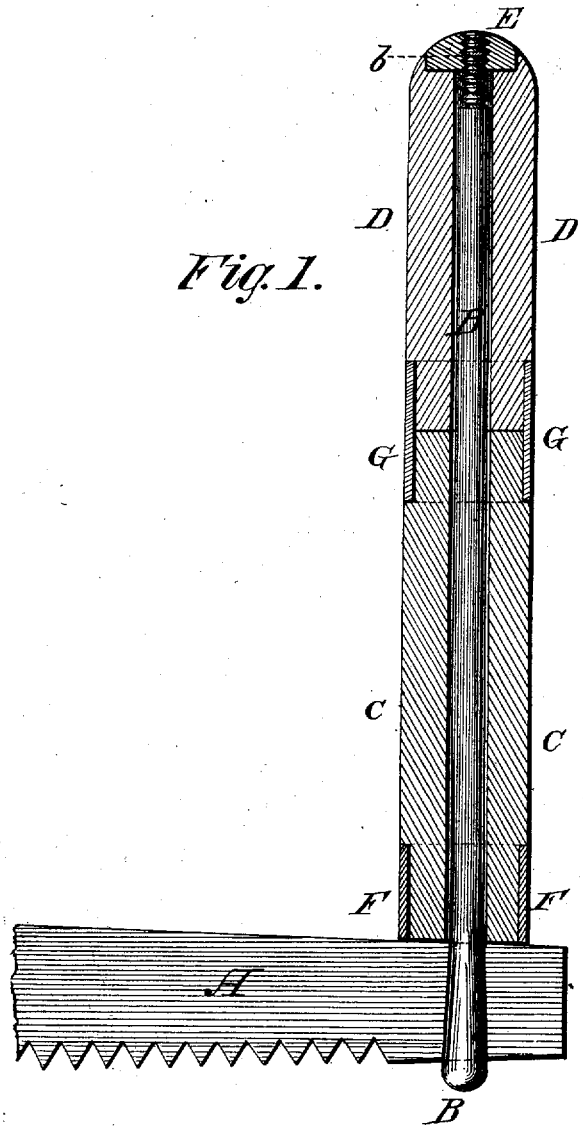
Figure 2:
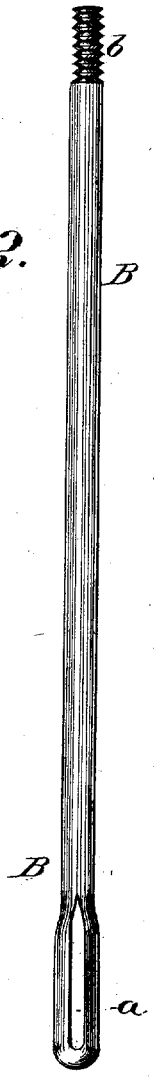

In the annexed drawing, Figure 1 is a side elevation of a crosscut-saw with my improved handle applied, the handle being shown in section, and Fig. 2 is an end view of the slotted rod which passes through the handle.

Like letters of reference indicate like parts.

A represents the blade of the saw; B, the slotted rod running up through the middle of the handle; C, the lower cylindrical portion of the handle; D, the upper end of the handle; E, nut in the upper end of the handle; F, collar on the lower end of the handle; G, sleeve between the parts C and D; *a*, slot in the lower end of the rod B; and *b*, screw-thread on upper end of said rod. I prefer to make the parts C and D of wood, and bore them longitudinally, for the reception of the rod B.

The collar F serves the common purpose of preventing the splitting of the lower end of the handle, and as a bearing for the top edge of that part of the saw A which is inserted in it. The sleeve keeps the two parts C and D together, and its upper edge serves as a bearing for the lower end of part D, the upper end of which carries the screw-nut E, which works on the screw-thread *b* on the upper end of rod B. The slot *a*, in the lower end of rod B, is for the reception of the saw-blade A.

To attach the handle to the saw, slip the slotted rod over the blade, and by turning the upper part D of the handle the part C is forced down and tightly binds the blade between the collar F and the lower surface of the slot *a*. A reverse motion of the part D releases the blade.

The necessity for the removal of the handle arises from the fact that in crosscut sawing, especially in heavy timber, the kerf is apt to pinch together at the top and prevent the retraction of the saw. It then becomes necessary to withdraw the saw longitudinally from the cut, to effect which the removal of the handle is requisite.

By this means a strong, efficient, and durable handle is provided—one which is not liable to get out of repair, and one which can be attached and detached at the will of the operator.

Having thus fully described my invention, what I claim as new, and desire to secure by Letters Patent, is—

1. A saw and handle, in combination with a clamping-bolt, B, and nut E, or its equivalent, whereby the saw is readily clamped and released, for the purpose specified.

2. The compound saw-handle hereinbefore described, the same consisting of the combination of the slotted rod B with the parts C and D of the handle, and the nut E, all constructed, arranged, and operating as and for the purpose specified.

In testimony that I claim the foregoing I have hereunto set my hand this 19th day of October, 1876.

JACOB NEIMEYER.

Witnesses:

THOMAS A. LAW,

EDWIN S. WEAVER.